(12) United States Patent   (10) Patent No.: US 12,561,386 B2
Leka   (45) Date of Patent: Feb. 24, 2026

(54) SYSTEM AND METHOD OF AI ASSISTED SEARCH BASED ON EVENTS AND LOCATION

(71) Applicant: Jumptuit, Inc., New York, NY (US)

(72) Inventor: Donald Leka, New York, NY (US)

(73) Assignee: JUMPTUIT, INC., New York, NY (US)

( * ) Notice: Subject to any disclaimer, the term of this patent is extended or adjusted under 35 U.S.C. 154(b) by 0 days.

(21) Appl. No.: 18/465,762

(22) Filed: Sep. 12, 2023

(65) Prior Publication Data

US 2024/0134923 A1   Apr. 25, 2024
US 2024/0232275 A9   Jul. 11, 2024

Related U.S. Application Data

(63) Continuation of application No. 15/950,932, filed on Apr. 11, 2018, now Pat. No. 11,803,602.

(51) Int. Cl.
| | |
|---|---|
| *G06F 7/00* | (2006.01) |
| *G06F 16/00* | (2019.01) |
| *G06F 16/2457* | (2019.01) |
| *G06F 16/907* | (2019.01) |
| *G06F 16/9535* | (2019.01) |
| *G06F 16/9537* | (2019.01) |
| *G06F 17/15* | (2006.01) |

(52) U.S. Cl.
CPC ...... *G06F 16/9537* (2019.01); *G06F 16/2457* (2019.01); *G06F 16/907* (2019.01); *G06F 16/9535* (2019.01); *G06F 17/15* (2013.01)

(58) Field of Classification Search
None
See application file for complete search history.

(56) References Cited

U.S. PATENT DOCUMENTS

| | | | | |
|---|---|---|---|---|
| 9,710,836 | B1 * | 7/2017 | O'Malley | .......... G06Q 30/0607 |
| 2014/0095521 | A1 * | 4/2014 | Blount | ................ G06F 16/9558 |
| | | | | 707/756 |
| 2015/0254683 | A1 * | 9/2015 | Haberman | ......... G06Q 30/0201 |
| | | | | 707/746 |
| 2016/0182515 | A1 * | 6/2016 | Barraclough | .......... G06Q 30/04 |
| | | | | 726/4 |
| 2016/0188843 | A1 * | 6/2016 | Staples, II | .............. G16Z 99/00 |
| | | | | 705/2 |
| 2017/0155631 | A1 * | 6/2017 | Du | ....................... G06F 21/6209 |
| 2017/0344223 | A1 * | 11/2017 | Holzer | ................... G06V 20/20 |

* cited by examiner

*Primary Examiner* — Tuan A Pham
(74) *Attorney, Agent, or Firm* — Sprinkle IP Law Group

(57) ABSTRACT

A method for independent event or location based search, with steps of receiving, from a user, at least one of calendar data and geo-location data and analyzing the at least one of the calendar data and the geo-location data. Then determining, using the at least one of the analyzed the calendar data and the geo-location data, without instructions from the user, an event or location based search request and searching semi-private metadata and semi-private correlated metadata related to the user with the event or location based search request to determine an event-location result. Lastly, providing to the user the event-location result.

16 Claims, 9 Drawing Sheets

SYSTEM AND METHOD OF AI ASSISTED SEARCH BASED ON EVENTS AND LOCATION

CROSS-REFERENCE TO RELATED APPLICATION(S)

This application is a continuation of and claims a benefit of priority under 35 U.S.C. 120 from U.S. patent application Ser. No. 15/950,932, filed Apr. 11, 2018, entitled "SYSTEM AND METHOD OF AI ASSISTED SEARCH BASED ON EVENTS AND LOCATION," issued as U.S. Pat. No. 11,803,602 on Oct. 31, 2023, which is fully incorporated by reference herein for all purposes.

FIELD OF THE INVENTION

The present invention relates to utilizing artificial intelligence to assist a user in searching and retrieving digital data based on calendar events and the user's location.

BACKGROUND

Human and machine generated metadata is exponentially increasing and fragmenting across an expanding universe of cloud services and Internet of Things (IoT) devices. The average person actively uses 27 apps that rely on cloud-based services in their personal lives, a combination of 36 personal and enterprise cloud services for work, owns 4 connected devices (e.g. smart phone, tablet, PC and smart TV) and uses additional devices for work. The average organization uses 1,427 cloud services across its employees including 210 collaboration services (e.g. Office 365, Slack), 76 file sharing services (e.g. Box, OneDrive), 56 content sharing services (e.g. YouTube, Flickr) and 41 social media services (e.g. Facebook, LinkedIn) and generates over 2.7 billion unique transactions each month (e.g. user logins, uploads, edits).

This proliferation of cloud services and IoT devices has accelerated the volume of data generated by consumers and organizations to 23 billion gigabytes per day. As some examples:

| Data Generated | Per Minute | Per Day |
|---|---|---|
| Dropbox Files Uploaded | 833 thousand | 1.2 billion |
| Email Sent/Received | 150 million | 215 billion |
| Facebook Posts Shared | 3 million | 4.3 billion |
| Facebook Posts Liked | 4 million | 5.8 billion |
| Instagram Posts Liked | 2.5 million | 3.6 billion |
| Twitter Tweets Posted | 350 thousand | 504 million |
| YouTube Minutes of Video Uploaded | 18 thousand | 25.9 million |

This pervasive and growing problem of data fragmentation across cloud services and IoT platforms affects consumers and organizations alike. As an example of a real word situation, a user is headed to a meeting and remembers a data point that is needed for the meeting. However, the user cannot remember where or when she last saw it. Email? Cloud drive? File sharing? Chat? Social media? The only feature the user can remember is that the info is about travel trends, and that there's a picture of a smiling woman and a palm tree. Currently, the user has to search for the data individually across all of her known digital connections. This increases time lost and increases the probability that the data cannot be found timely. What is needed is a means to quickly retrieve and act on data across a broad spectrum of cloud services and IoT platforms.

There are applications that can track a user's events and their locations. There are also applications that can map a user to a destination. Additionally, there are applications that can search for particular items surrounding a location. However, none of them are tied to a search AI that can search the user's own repository for data relevant to the event and/or location.

SUMMARY

The present invention solves the above problems using a system and/or an AI E/L search assistant that receives from the user at least one of calendar data and geo-location data. This data can be received at a server or any one of the user devices and the below steps can be performed at any device in the system. The calendar data and/or the geo-location data can be analyzed, which in certain examples can be done using a processor running instructions to implement at least one algorithm. The AI E/L search assistant can then determine, using the analyzed calendar/geo-location data, an event or location based search request. This search request can be made without instructions from the user. The user does not need to provide any details for the search other than the details provided in the calendar event. The AI E/L search assistant searches the semi-private metadata, with the event or location based search request to determine an event-location result. The search can be performed by the AI E/L search assistant or the search engine and, in examples, can encompass requests to digital assistants. The event-location result can then be provided to the user. The event-location result can be provided in any format acceptable to the user or based on the user's device.

In other examples, the searching step can be initiated based on a time interval earlier than the time in the calendar event and/or a distance interval a distance from the location in the calendar event. The providing step can have an additional step of categorizing the event-location result based on the calendar data. The categorized event-location results, as an example, can be provided during the providing step.

A system for independent event or location based search is described throughout, but an example can have a server that receives from the user the calendar data a and/or the geo-location data a. The event-location search engine can implement at least one algorithm to analyze the calendar and/or geo-location data, determine, using the analyzed data, without instructions from the user, an event or location based search request. It can then search the semi-private metadata related to the user with the event or location based search request to determine an event-location result; and can have a display providing the user the event-location result. The display can be on any or all of the user devices.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

FIG. 1 is a schematic overview of the system of the present invention;

FIG. 6 illustrates an example of an AI E/L search assistant;

DETAILED DESCRIPTION

Figure 1:
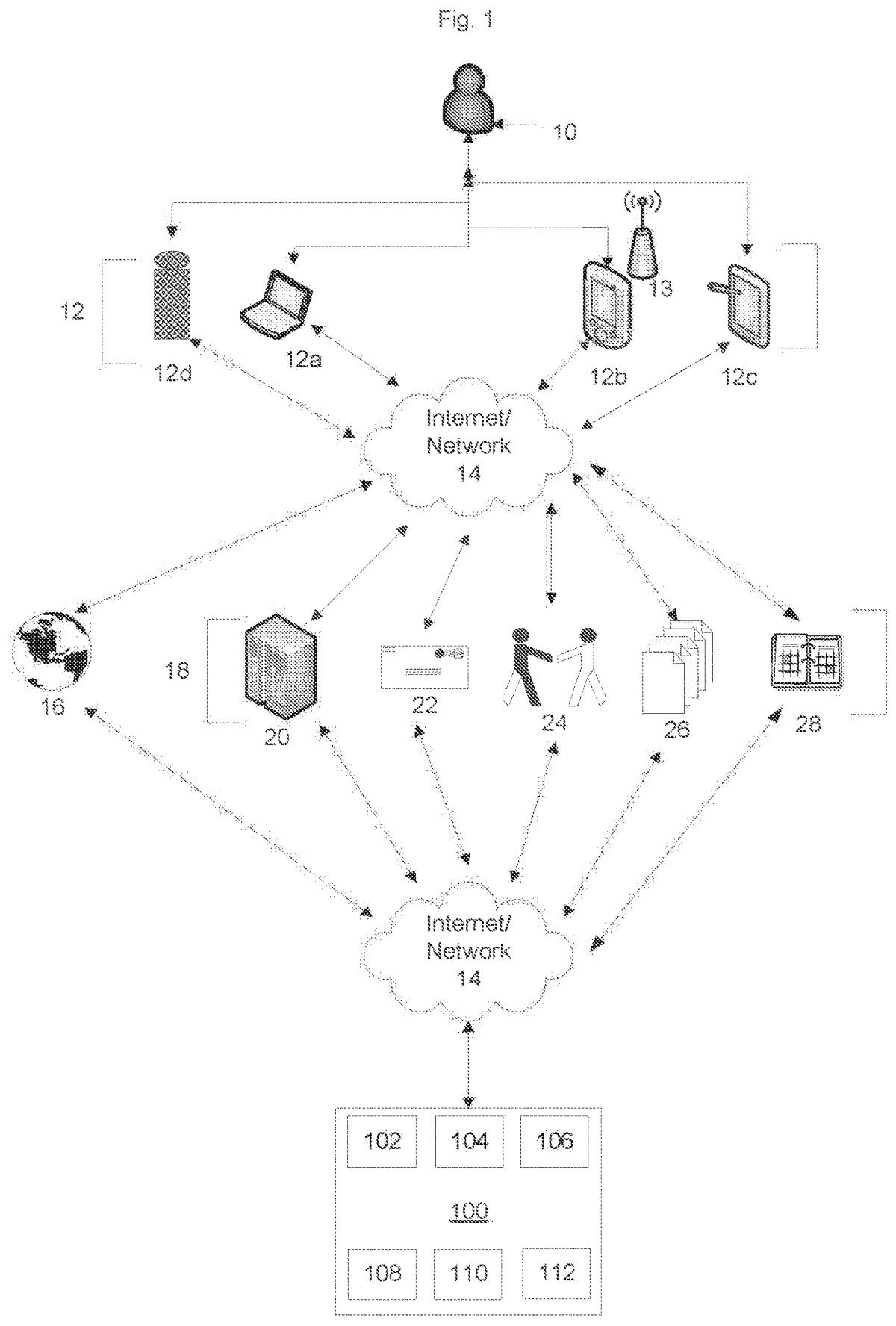
Figure 2:
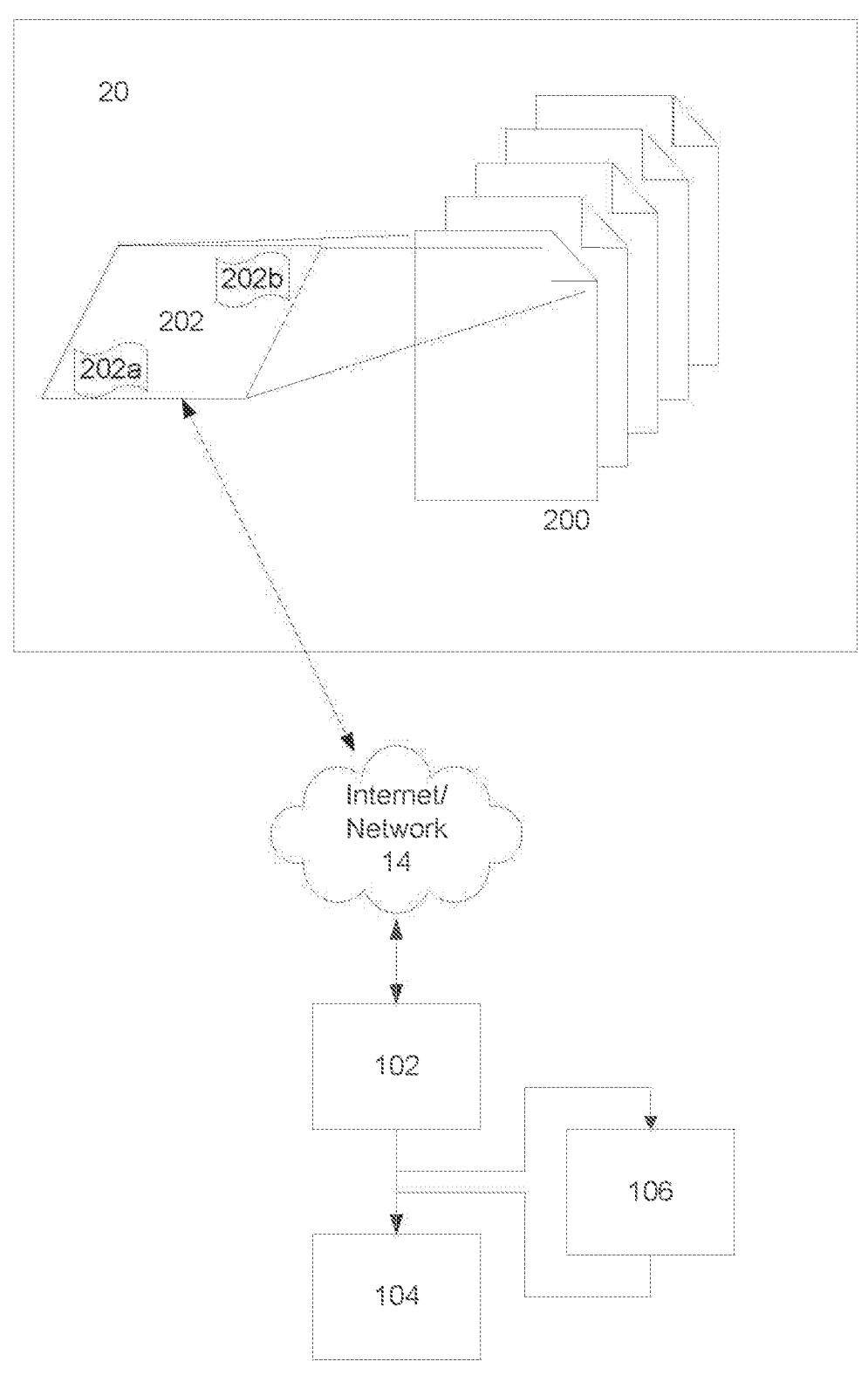
FIG. 2 illustrates an example of the data reticulation process.

Turning to FIG. 1, an overview of the system 100 is illustrated. A user 10 can have any number of internet connect devices 12, including a laptop 12a, a smartphone 12b, a tablet 12c, a smart speaker 12d, an internet connected watch (not illustrated), smart car (not illustrated), smart appliance (not illustrated), smart TV (not illustrated), and all other networked content creation and delivery devices. All or most of a user's 10 devices 12 can also have location tracking hardware or software 13. One example of location tracking hardware 13 uses a GPS ("global positioning system") chip to track the user's location almost anywhere on the globe. Other location tracking applications can use existing cellular towers and triangulate the user's position based on signal strength determinations from multiple towers. Other position location techniques can include knowing the location of the wireless access point the user 10 is accessing to access the internet 14. Additionally, there are other methods well known in the art.

The user 10 can interact with the devices 12 which in turn are connected to the internet 14 or other networks: public, private, or worldwide. These connections allow the user to access content 16 broadly or utilize any number of services 18, including file storage 20, email servers 22, social media 24, and collaboration and content sharing 26, calendar 28, and gaming platforms (not illustrated), as just an example of the myriad of on-line services and accounts available to the user 10. The user 10 then can permit the system 100 to access her content 16 and services 18 to begin the process of data reticulation.

The system 100 can have a scanning engine 102, storage 104, analysis engine 106, search engine 108, security exchange 110, and display engine 112. Discussions of the security exchange 110, the display engine 112 and other aspects of the system 100 are incorporated herein by reference from co-pending application Ser. No. 15/950,866, filed Apr. 11, 2018, and titled "System and Method of Correlating Multiple Data Points to Create a New Single Data Point".

FIG. 2 is an example of the system 100 that performs the data reticulation process. In an example of a first instance, the scanning engine 102 scans all of the information associated with the user's devices 12, content 16, and services 18. As is known in the art, all or most individual pieces of data 200 have metadata 202 attached. The metadata 202 describes and provides information about the data 200 without needing to access the data 200 itself. The metadata 200 can include metadata 202a added by the individual services 18 in addition to user generated metadata 202b. In one example, the scanning engine 102 can just extract the metadata 202 associated with each piece of data 200 and store the metadata 202 in the memory 104.

As a concrete example, the user 10 can store a Word document 200 in her DropBox account 20. The Word document has the user generated metadata 202b attached to it, which can include author, creation date, and store a number of changes made by the user 10 during the creation of the document. DropBox 20 can also add metadata 202a regarding the time and number of uploads, downloads, etc. The scanning engine 102 can just extract that metadata 202 without accessing the document 200. The scanning engine 102 then stores the metadata 202 for further use, described below.

Figure 3:
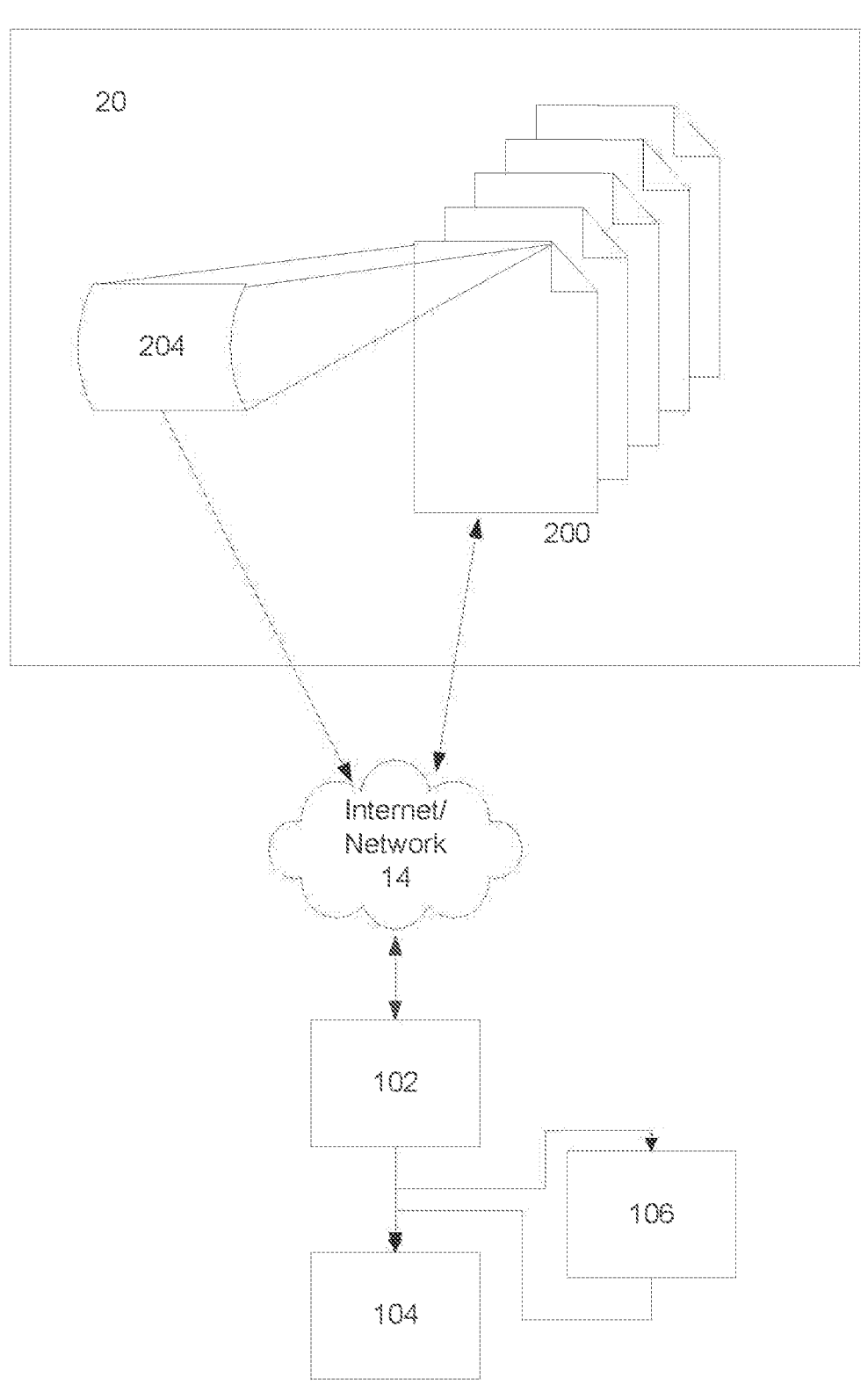
FIG. 3 illustrates another example of the data reticulation process.

Another example of the scanning engine 102 can be that the scanning engine 102 takes each piece of data 200 and creates new metadata 204 based on its own scanning and processing algorithm. FIG. 3 illustrates that the scanning engine 102 accesses each piece of data 200, performs a scan, and then creates the new metadata 204. The new metadata 204 is then stored in memory 104. In this example, extended from the one above, the scanning engine 102 reads the Word document 200 and can capture additional information (i.e. addresses and addressees of correspondence, main themes, etc.) and then creates the new metadata 204 from the read.

A further example can allow the scanning engine 102 to both read the existing metadata 202 and acquire the new metadata 204. The two metadata 202, 204 can be combined or stored separately in memory 104. Additionally, both examples above allow the data 200 to remain stored at the service 18 or device 12 and only the metadata 202, 204 is stored in the memory 104 of the system 100. In alternate examples, all of the data 200 can be redundantly backed up and stored in the memory 104 as well.

The scanning engine 102, along with scanning the user's devices 12, content 16, and services 18 can also acquire information regarding the user's profile attached with each of the devices 12 and services 18. This allows for more personalized data 208 to be provided to the analysis engine 106. The scanning engine 102 can also track the user's 10 interactions with each of the devices 12, content 16, and services 18. For example, the scanning engine 102 can track the facts that the user 10 typically accesses her social media sites 24 from her smartphone 12b but accesses e-mail primarily from her laptop 12a. These trends can also be passed to the analysis engine 106 to be added to correlated metadata 206 (discussed below) and be of use to optimize the search engine 108. For example, a search for data noted to be likely found in an e-mail can be optimized by looking first at data created on the laptop 12a.

As data 200 is constantly changing, the scanning engine 102 is constantly updating the metadata 202, 204 it provides to storage 104 and/or the analysis engine 106. The scanning engine 102 can also monitor which device 12 the user 10 is using at any one time and which devices 12 are registered to the user 10. That information can be provided to the system 100 to permit seamless delivery of data 200 to the user 10.

The scanning engine 102 can be one or more algorithms designed to analyze user data 200. Specialized algorithms can be designed for each type of data 200. Photo analysis and image recognition can be performed by one algorithm while text analysis for words and context can be done by another. These scanning modules of the scanning engine 102 can then be upgraded, debugged, and replaced without disturbing the other aspects of the scanning engine 102.

The storage/memory 104 is non-transient and can be of the type known to those of skill in the art, e.g., magnetic, solid state or optical. The storage 104 can be centralized in a server or decentralized in a cloud storage configuration. The metadata 202, 204 and/or correlated metadata 206 can be stored in a database. In one example, each user 10 can have a record or entry in the database. A user's entry is ever expanding as she generates more and more data 200 to reticulate and extract from. The correlated metadata 206 can be expanded as the user 10 also engages additional services 18. The user entry can be updated in real time, providing a constantly up-to-date profile of the user 10 and her digital footprint, allowing the system 100 to more easily provide results to the questions/requests posed to the search engine 108, as discussed below.

As the data 200 is being scanned by the scanning engine 102 and metadata 202, 204 stored in memory 104, the analysis engine 106 reviews the metadata 202, 204 and creates additional correlated data points 206 relating the data 200. The correlated data points 206 can be generated from a combination of metadata 202, 204 and interpreting the information therein. Thus, the analysis engine 106 analyzes the metadata 202, 204 and finds correlations between what may be disparate and unrelated data points 200 and saves that information as correlated metadata 206.

For example, the user 10 could have taken a trip to Italy and there are photos taken during the trip on one or more of the user's devices 12 and/or uploaded to the user's photo storage 20 and social media accounts 24. Further, there are calendar entries detailing where the user 10 is on a particular day and a Word diary of the trip. The analysis engine 106 can use the date and geotagging information in the photos to determine location. Image recognition analysis can be performed on the images to extract additional details and all of this can be compared against the calendar and diary entries for increased accuracy. Correlated metadata 206 can be created linking all of the original data 200 and additional details can also be extracted and correlated to data points 206 related to the user's likes and dislikes.

Thus, in one example, user metadata 202 and new metadata 204 can be used to link a photo, calendar, and diary entry to detail that the user 10 met a particular person at a particular place and time, and ate a meal. Thus, the correlated metadata 206 can link a picture of the Trevi Fountain, a calendar entry to meet Robert Langdon, and ate at the Il Gelato de San Crispino in Rome. In a deeper correlation, from, for example, the photos and diary 202, 204 it can be determined that pistachio is the user's 10 favorite gelato and Mr. Langdon was wearing a tweed jacket and that correlated metadata 206 can also be saved 104.

The analysis engine 106 can also be a combination of algorithms or individual services that sort and analyze the metadata 202, 204, 208 and create the correlated metadata 206. The correlated metadata 206 can be metadata not already generated from the service metadata 202a, the user metadata 202b and the personalized metadata 208. The correlated metadata 206 can include very specific details gleaned from the data 200 or relationships between the metadata 202, 204, 208 that no one set of metadata 202, 204, 208 had captured.

For example, Word, while generating document metadata 202a cannot correlate that data with images posted on Facebook and music listened to on Pandora. The analysis engine 106 can determine that after the user's trip to Italy, she developed a taste for opera. Facebook may have the images of the opera house, Outlook may have the calendar entry for the user's first opera, and Pandora may note that the user is now listening to opera streams, but the analysis engine 106 assembles the pieces to determine that the user 10 started to appreciate opera only after her trip. This analysis happens across all of the user's data.

In additional examples, the correlated metadata 206 can include data groupings. The data groupings are information that relates like files over one or more dimensions. The groupings can relate to a single event, like a trip to Italy, or even more specific to just the churches visited in Italy, or churches visited throughout Europe over many trips to different cities. The same data 200 can be in many different groupings, if the content dictates. The groupings can be formed from data 200 residing on any device 12, content 16, or service 18. The similarities between related data 200 are gleaned from the correlated metadata 206. The analysis for correlated metadata 206 can get as granular as sentiment/emotional state in the writings and images. Smiles, frowns, clipped tones, laughs, and inflections can be used to determine basic emotional states and that can be added to the correlated metadata 206.

Figure 4:
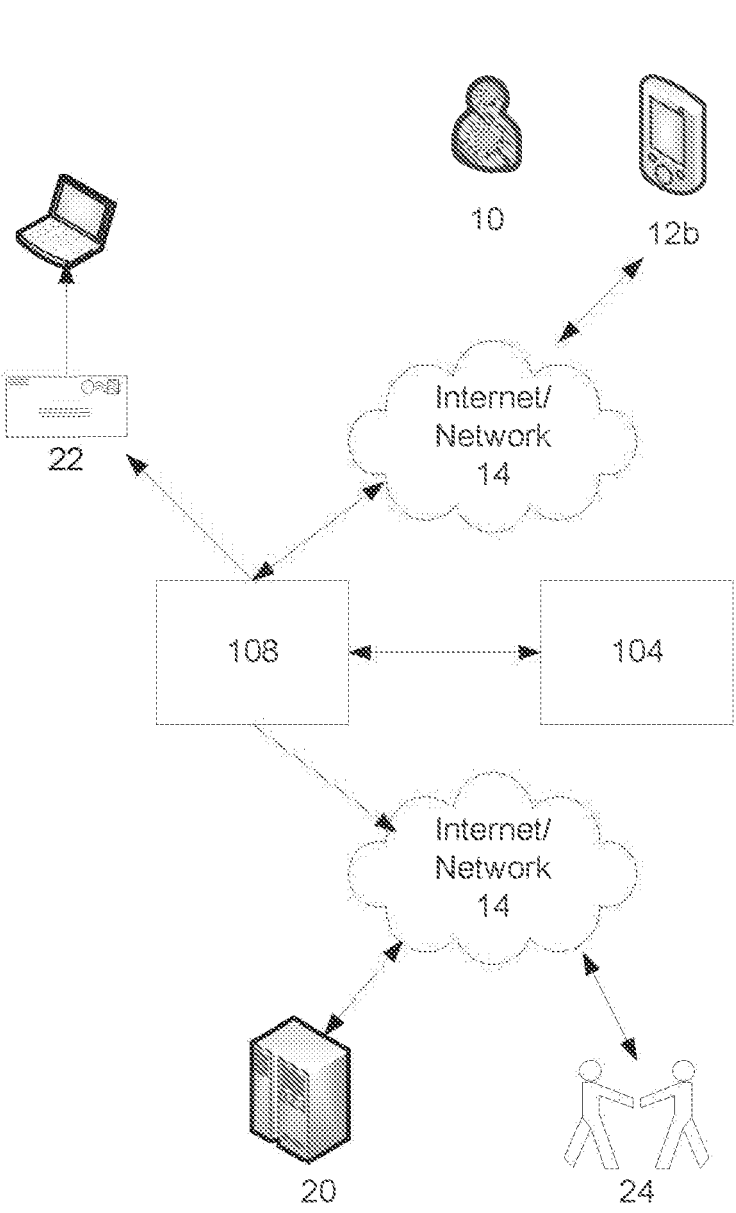
FIG. 4 illustrates an example of the search engine.

FIG. 4 illustrates the search as detailed above looking for the single data point. The user 10 queries the system 100, by voice on her smartphone 12a "I am looking for a picture of a smiling woman and a palm tree with text involving travel." The search engine 108 now searches the correlated metadata 206 in the memory 104 to find the answer to the question. The search engine 108 determines the possible answers to the question and additionally determines that one possible answer resides in the user's file storage 20 and the other resides in the user's social media account 24. The search engine 108 can then reply to the user 10 either with copies of the data 200 from both locations 20, 24 or links to those locations/data. The user 10 can further request the search engine 108 to e-mail the data to a third party. The search engine 108 can access the user's e-mail account 22 and contacts to create a new e-mail with attachments and ask the user 10 to dictate the accompanying text.

The scanning, analysis and storage of correlated metadata 206 allows for a much more robust search with the search engine 208. The search engine 108 can receive user input in any form, including text and voice, to search the user's 10 data 200. The search can be general, specific, and/or somewhat free form. By using the correlated metadata 206 a user can ask for "when was I at Trevi Fountain", "who did I meet at Trevi Fountain", and/or "what was my favorite gelato flavor"? Because the correlated metadata 206 can link back the original metadata 202, 204, the original data 200 can be produced if a subsequent search query requests it. The search engine 108 can also create links or attachments for the data 200 requested.

Figure 5:
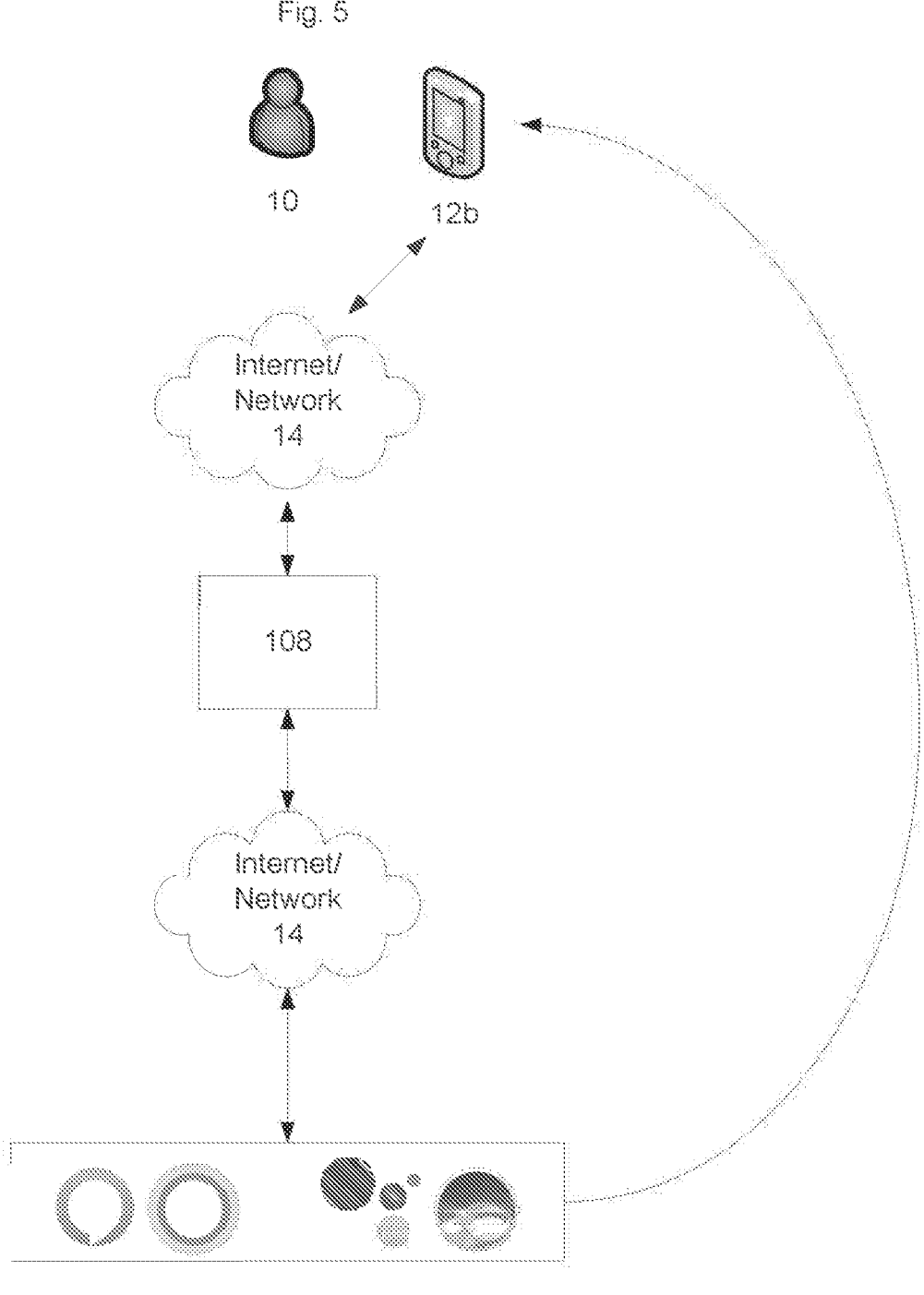
FIG. 5 illustrates an example of the system interfacing with digital assistants.

The search engine 108 can use natural language processing to search the user data 200 linked to the service 100, in most or all of the native world languages of the user 10. In addition, the search engine 108 can interface across platforms with other digital assistants 400 (e.g. Alexa, Cortana, Siri, Google Assistant, etc.) to leverage the search features built into the digital assistants. Different digital assistants 400 perform and are optimized for different search and query functions. Certain digital assistants 400 are optimized for ecommerce, device and OS operations, fact retrieval, etc. and the search engine 108 can expand the results of a user 10 inquiry. For example, the analysis engine 106 determined the user 10 is interested in opera. The search engine 108 can query an ecommerce digital assistant for books, videos and audio recordings, the fact assistant for time, date, and location of the next operatic performance near the user 10, and the OS assistant to add the feature to the user's calendar and provide directions to the performance. The results from the digital assistant 400 can be directed back through the search engine 108 or reported directly from the digital assistant 400 to the user 10, as illustrated in FIG. 5.

Given all of the above, while advanced algorithms are being used to create metadata 202, 204, 206 to be searched there is still a need for advanced machine learning algorithms (also called artificial intelligence or "AI") to assist the user 10 in requesting and retrieving the data 200 quickly and efficiently.

Figure 6:
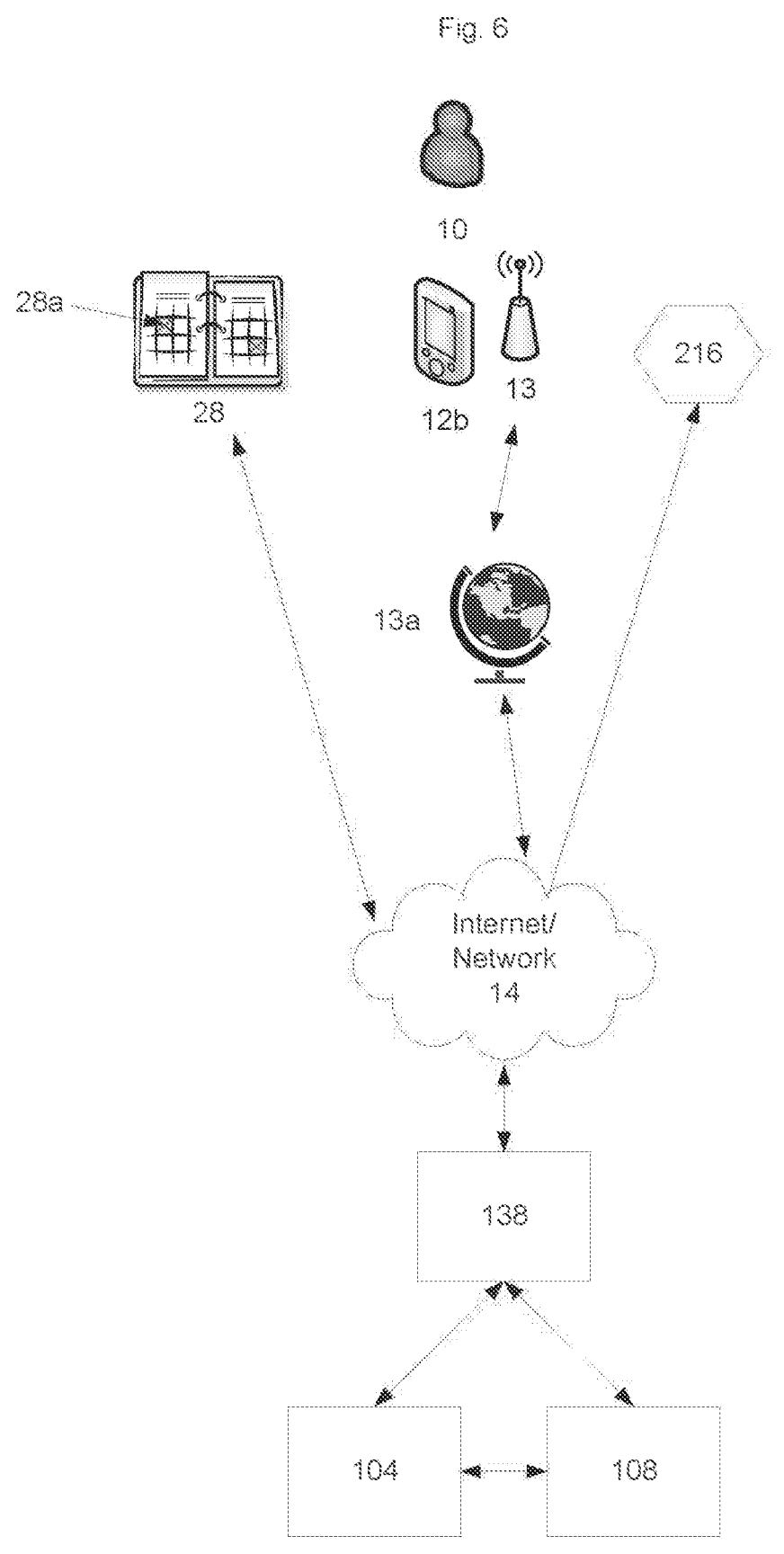

FIG. 6 illustrates an AI E/L search assistant 138 accessing the user's calendar 28. The calendar 28 can be stored on a smartphone 12b or other user device 12, or present in memory 104 or on the web based storage or application 18. The AI E/L search assistant 138 can keep track of calendar events 28a and react as events come closer in time. In an example, the AI E/L search assistant 138 can see that an internal meeting is scheduled with the user's 10 team. The AI E/L search assistant 138 can then initiate a search by itself or through the search engine 108 for all data 200 related to that particular meeting and return an event/location result 216. Photos, e-mails, relevant documents, internet search results, social media feeds, etc. can be culled automatically. Another example is a student user 10 heading to class. The AI E/L search assistant 138 can pull all of the relevant materials related to the class the user 10 is about to attend.

The AI E/L search assistant 138 can also key a search based on the user's location based on geo-location data 13a received from the user's location tracker 13. While an event 28a may not be in the calendar 28, the AI E/L search assistant 138 can access the user's location data 13a and attempt to determine what event may be at that location or a user's final destination which may have an event. To extend the above example, the AI E/L search assistant 138 can start to pull the user's 10 class materials as the user 10 travels to campus once it determines that the user 10 is in transit.

Figure 7:
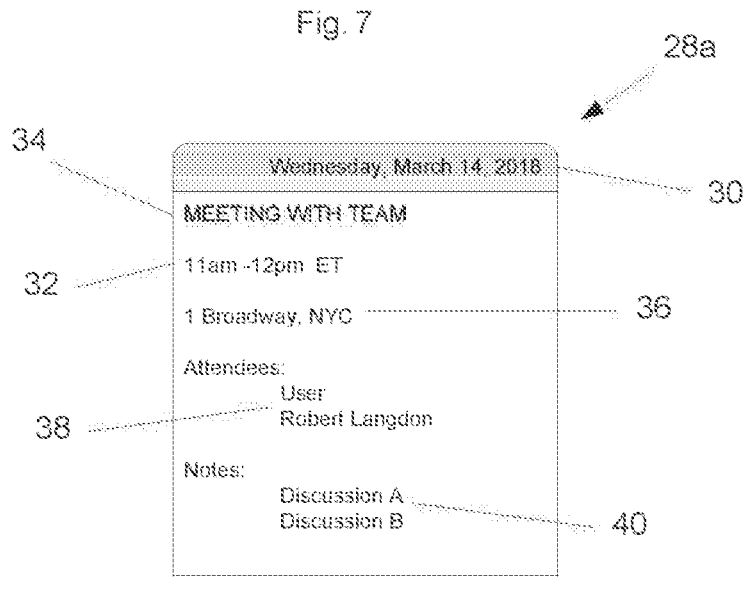
FIG. 7 illustrates an example of a typical calendar event.

As an example, FIG. 7 illustrates a typical calendar event 28a. The event 28a can include a date 30, time 32, subject 34, location 36, attendees 38 and notes 40. The AI E/L search assistant 138 can use each piece of the event data 30, 32, 34, 36, 38, 40, along with the metadata 202, 204, 206 208 to determine which search strings are relevant to the event 28a, and then use that to prepare the event/location result 216.

Figure 8:
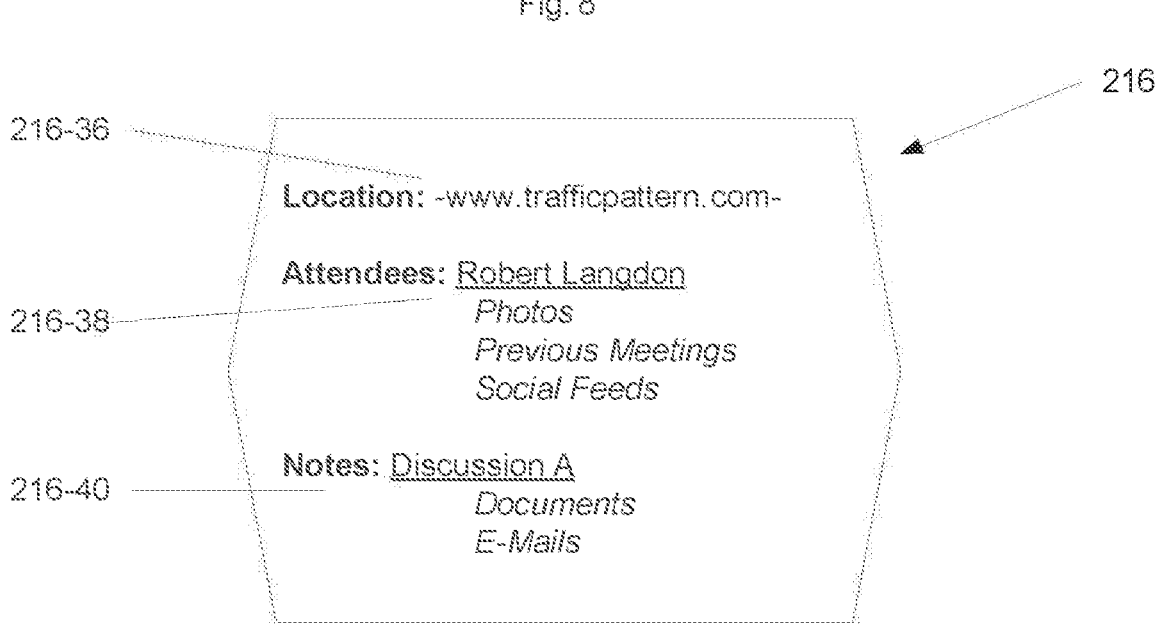
FIG. 8 illustrates an example of an event/location result.

In one example, the event/location result 216 can be presented categorized based on the event data 30, 32, 34, 36, 38, 40 used. Thus, results surrounding the attendees 38 can be separately displayed or linked from the results. FIG. 8 illustrates an example of this, the event/location result 216 can list a location result 216-36, in this instance, a link to the traffic pattern around the destination. Attendee results 216-38 and note results 216-40 can be listed and segmented by topic or data.

The AI E/L search assistant 138 can understand where a user 10 may be going based on an initial screen of the user's metadata 202, 204, 206 208. Pictures can provide lists of possible locations as most digital images include the latitude and longitude embedded in the image. Additionally, a destination entered into a mapping application or an on-line vehicle request application (Uber, Lyft, etc.) can be used as well.

Figure 9:
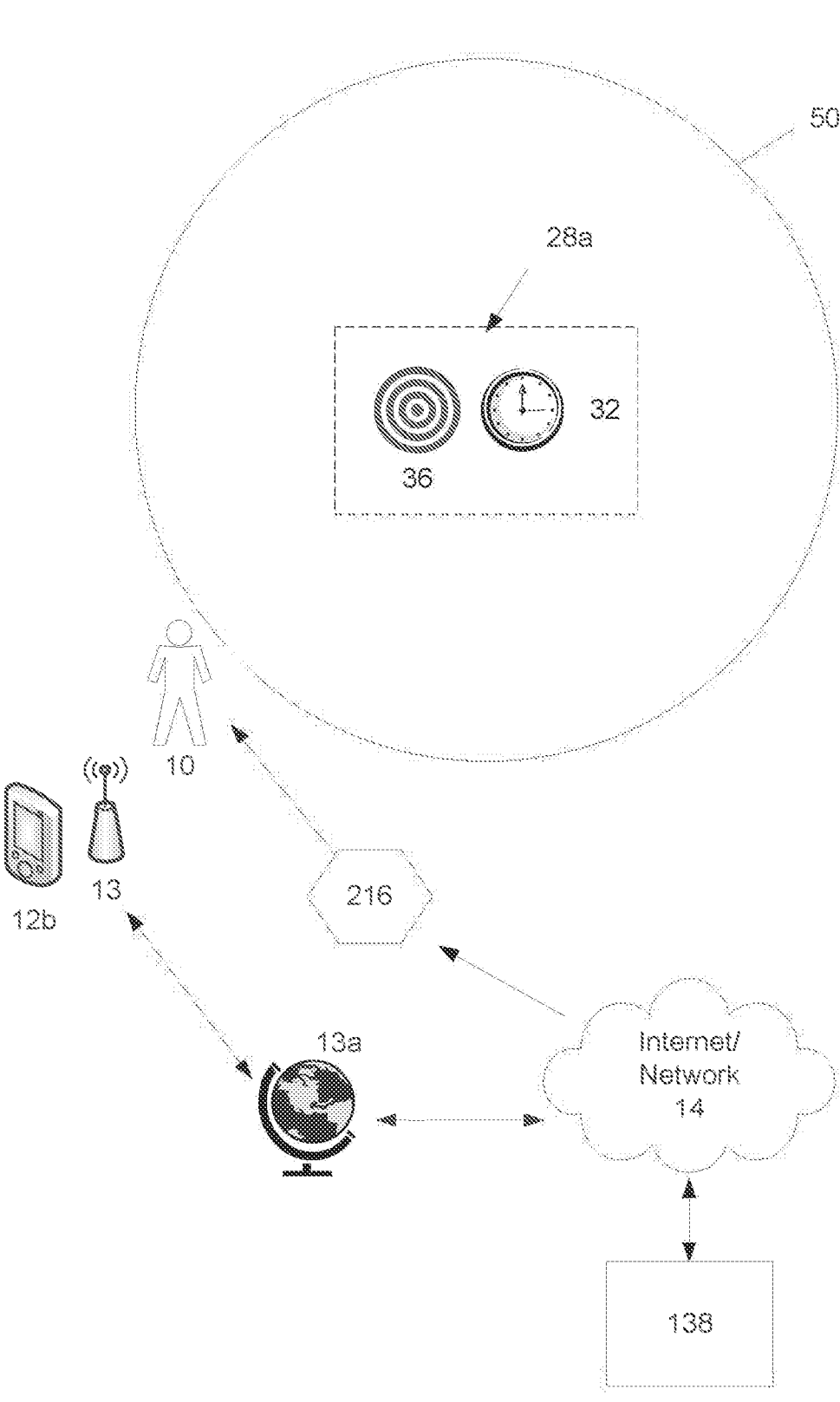
FIG. 9 illustrates an example of an interval.

FIG. 9 illustrates this concept of the time 32 and location 36 of the typical calendar event 28a. The AI E/L search assistant 138 can determine a time interval/distance interval 50 from the event 28a. The time interval/distance interval 50 is illustrated here as a perimeter, but one of skill in the art is aware that the intervals can be stored in any fashion known. As the user approaches the interval 50, either as a time earlier than the event time 32, or the physical distance from the location 36, the AI E/L search assistant 138 can either start the search, update the search, or begin delivering the event/location result 216. In different examples, the AI E/L search assistant 138 can begin a search the moment the user 10 enters the calendar event 28a. The results can be stored and then delivered at the appropriate interval 50. Depending on the amount of time and or data 200 that has changed/passed since the first search, the AI E/L search assistant 138 can refresh the search at the appropriate interval 50. Alternately, the AI E/L search assistant 138 starts the search and delivers the event/location result 216 once the interval 50 is reached.

The interval 50 can be set numerous ways, in an example, the user 10 can preset a time or distance for the AI E/L search assistant 138 to start to search or return results or the AI E/L search assistant 138 can have a set interval 50. Alternately, the AI E/L search assistant 138 can set the interval 50 dynamically. The system 100 and/or the AI E/L search assistant 138 can monitor the user's 10 geo-location data 13a, how fast the user 10 is traveling to the location 36, the distance to the location 36, the average time to produce the result 216, and the current data transfer rate to the user's device 12. Based on one or more of these factors, the AI E/L search assistant 138 can set the interval 50 to deliver the result 216 timely. If the user 10 is driving to the location 36 and has poor cell reception, the interval 50 may be set at a point early enough to account for the speed to the destination and the poor transfer rate. Conversely, if the user 10 is walking is a good reception zone, the interval 10 may be shortened.

The information that triggers the AI E/L search assistant 138 comes from the user's data 200 and metadata 202, 204, 206 208, which is semi-private. Semi-private means the data 200 and metadata 202, 204, 206, 208 are not available to the general public. The data 200 and metadata 202, 204, 206, 208 are personal to the user 10 or related to the user's employment or employer. In an example, the data 200 and metadata 202, 204, 206, 208 are kept on controlled access storage 104. Controlled means that the data 200 and metadata 202, 204, 206, 208 are restricted from non-permitted users, but can be accessed by groups of permitted users. Examples include the data 200 and metadata 202, 204, 206, 208 kept on a personal smartphone, cloud storage accessible to friends and family, and/or company based servers and storage. While the user 10 and a select group have access, the majority of people cannot search or access the data 200 and metadata 202, 204, 206, 208. Some examples also return general information as well (traffic, stock ticker information for the company being visited, etc.) however, a key part of the invention can be returning to the user 10 semi-private data based on a calendar entry or user location.

Regardless if an event or a location triggers the AI E/L search assistant 138, this type of search is a "push" search. Here the result 216 is being "pushed" to the user 10 without the user 10 making the request. This is opposite of a typical user 10 search which is a "pull" search. In a "pull" search the user is making a request to search for and "pull" information.

Figure 10:
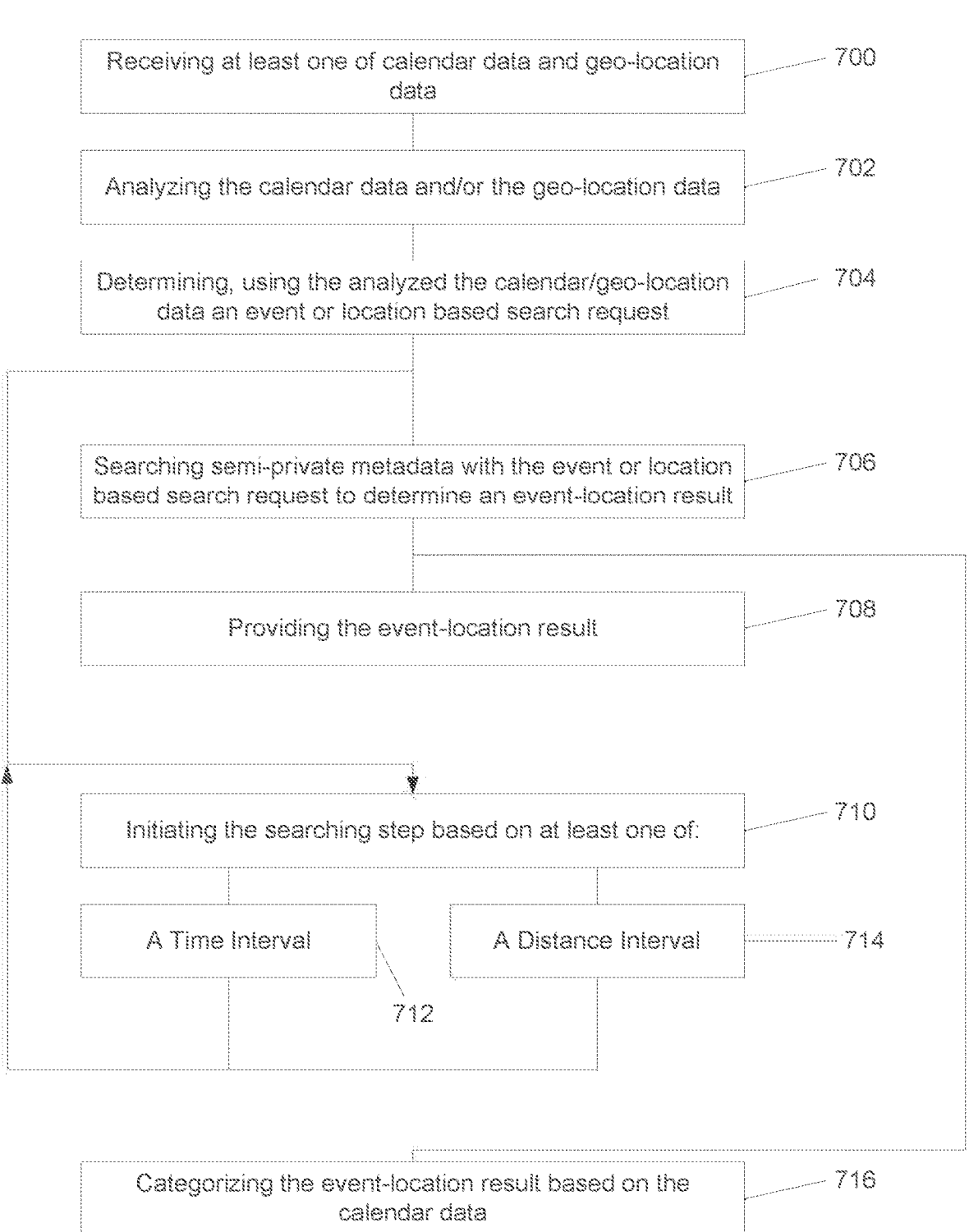
FIG. 10 is an example of a method of the present invention

FIG. 10 illustrates an example of the method for independent event or location based search. Here the system 100 and/or the AI E/L search assistant 138 receives from the user at least one of calendar data 28a and geo-location data 13a (step 700). This data 28a, 13a can be received at a server or any one of the user devices 12 and the below steps can be performed at any device in the system 100. The calendar data and/or the geo-location data can be analyzed (step 702), which in certain examples can be done using a processor running instructions to implement at least one algorithm. The AI E/L search assistant 138 can then determine, using the analyzed calendar/geo-location data, an event or location location-based search request (step 704). This search request can be made without instructions from the user 10. The user 10 does not need to provide any details for the search other than the details provided in the calendar event 28a. The AI E/L search assistant 138 searches the semi-private metadata 202, 204, 206 208 with the event or location based search request to determine an event-location result 216 (step 706). The search can be performed by the AI E/L search assistant 138 or the search engine 108 and, in examples, can encompass requests to digital assistants 400. The event-location result 216 can then be provided to the user 10 (step 708). The event-location result 216 can be provided in any format acceptable to the user 10 or based on the user's device 12.

In other examples, the searching step can be initiated based on (step 710) a time interval 50 earlier than the time 32 in the calendar event 28a (step 712) and/or a distance interval 50 a distance from the location 40 in the calendar event 28a (step 714). FIG. 10 further shows an embodiment of the providing step (step 708) having an additional step of categorizing the event-location result based on the calendar data (step 716). The categorized event-location results 216-36, 216-28, 216-40, as an example, can be provided during the providing step (step 708).

A system for independent event or location based search is described throughout, but an example can have a server that receives from the user 10 the calendar data 28a and/or the geo-location data 13a. The event-location search engine 138 can implement at least one algorithm to analyze the calendar and/or geo-location data, determine, using the analyzed data, without instructions from the user, an event or location based search request. It can then search the semi-private metadata related to the user with the event or location based search request to determine an event-location result; and can have a display providing the user the event-location result. The display can be on any or all of the user devices 12.

Turning back to the system 100 as a whole, one or more aspects of the search engine 108 can reside on the user devices 12 while the memory 104 and other aspects of the search engine 108 can reside either on a single server or distributed through cloud computing and storage. A decentralized computing example can have the benefit of quicker response time and the ability to leverage additional computing power and storage quickly.

The search engine 108 can be software implemented on general purpose or specifically designed hardware or processors. Each of the parts 102, 104, 106, 108, 110, 112 of the system 100 can also be distributed over a network. In one example, the scanning engine 102 can be numerous different algorithms on numerous different platforms. Thus, data 200 that comprises both text and images can be processed twice, once through the text analyzer and a second time through the image analyzer. This allows both mediums to have optimal processing.

The system 100 is robust to operate with all or most devices 12 and services 18. Table 1 is a partial list of the devices 12 and services 18 that the system 100 can currently interact with.

10

TABLE 1

| Collaboration | File Sharing | Content Sharing | Social Media | IoT Devices |
|---|---|---|---|---|
| Asna | Amazon Cloud Drive | Dailymotion | Facebook | Amazon Echo |
| Bitbucket | Box | DeviantArt | Foursquare | Amazon Fire |
| Evernote | Dropbox | Flickr | Google Hangouts | Android Smartphones |
| GoToMeeting | Google Drive | Imgur | | Android Tablets |
| GitHub | Microsoft OneDrive | Instagram | LinkedIn | Android Smart TVs |
| Gmail | | Pandora Radio | Messenger | Android Wearables |
| Google Docs | | Photobucket | Twitter | Android Smart Speakers |
| Microsoft Teams | | Picasa | Tumblr | iPhone |
| Office 365 | | Pinterest | | iPad |
| Outlook Mail | | Soundcloud | | HomePod |
| Salesforce | | Spotify | | Apple TV |
| SharePoint Online | | Vimeo | | Apple Watch |
| Skype | | Xbox Live | | Mac Computers |
| Slack | | YouTube | | Win 10 PCs |
| Slideshare | | | | Win 10 Tablets |
| Trello | | | | Win 10 Smartphones |
| WebEx | | | | Xbox One |
| Yammer | | | | Win 10 Wearables |

It must also be noted that, as used in the specification and the appended claims, the singular forms "a," "an" and "the" include plural referents unless the context clearly dictates otherwise. By "comprising" or "containing" or "including" is meant that at least the named component or method step is present in the article or method, but does not exclude the presence of other components or method steps, even if the other such components or method steps have the same function as what is named.

It is also understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art.

Certain examples of this technology are described above with reference to flow diagrams. Some blocks of the block diagrams and flow diagrams may not necessarily need to be performed in the order presented, or may not necessarily need to be performed at all, according to some examples of the disclosure.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for search, comprising:

ingesting, from a plurality of sources, individual pieces of data and associated metadata, wherein the associated metadata is associated with the individual pieces of data;

generating correlated metadata to link the individual pieces of data from different sources together, wherein generating the correlated metadata comprises:

analyzing the associated metadata and content of the individual pieces of data, wherein the analyzing comprises image recognition analysis and at least one of:

time analysis;

location analysis; or text analysis;

wherein the analyzing further comprises determining correlations between the individual pieces of data based on shared temporal, spatial, or semantic properties identified during the analyzing;

performing the image recognition analysis on an image to extract additional image details, wherein the additional image details are stored as correlated metadata;

linking the individual pieces of data based on the determined correlations by storing relationship information within the correlated metadata, wherein the correlated metadata comprises the stored relationship information establishing links between the individual pieces of data, the correlated metadata correlating the individual pieces of data based on the identified shared temporal, spatial, or semantic properties, the correlated metadata thereby correlating the individual pieces of data to at least one of a location or an event described by the associated metadata and enabling searching based on the location or the event;

autonomously determining, by an artificial intelligence (AI) search assistant and without receiving a search command from a user, a search query based on at least one of:

calendar data corresponding to an upcoming event; or geo-location data corresponding to a location of a user device;

searching, by the AI search assistant, the correlated metadata using the determined search query to identify information correlated with the event or the location; and providing a search result comprising the identified information.

2. The computer-implemented method of claim 1, wherein generating the correlated metadata further comprises analyzing the individual pieces of data to extract additional details from the individual pieces of data and storing the additional details in the correlated metadata.

3. The computer-implemented method of claim 1, wherein analyzing the individual pieces of data to extract additional details from the individual pieces of data further comprises performing an image recognition on an image to extract additional image details, wherein the additional image details are stored as correlated metadata.

4. The computer-implemented method of claim 3, wherein performing the image recognition to extract the additional image details comprises performing the image recognition to determine at least one of an image location, an identity of a person, or an object in the image.

5. The computer-implemented method of claim 3, further comprising comparing the additional image details to other data to correlate the image to at least one of the event or the location.

6. The computer-implemented method of claim 5, wherein comparing the additional image details to the other data to correlate the image to at least one of the event or the location comprises comparing the additional image details to at least one of a calendar entry of a user or a diary entry of the user.

7. The computer-implemented method of claim 1, wherein the correlated metadata comprises a data grouping that relates the individual pieces of data over at least one dimension.

8. The computer-implemented method of claim 7, wherein the data grouping relates the individual pieces of data based on at least one of: the location or the event.

9. A computer program product comprising a non-transitory, computer-readable medium having stored therein computer-executable instructions, the computer-executable instructions comprising instructions for:

ingesting, from a plurality of sources, individual pieces of data and associated metadata, wherein the associated metadata is associated with the individual pieces of data;

generating correlated metadata to link the individual pieces of data from different sources together, wherein generating the correlated metadata comprises:

analyzing the associated metadata and content of the individual pieces of data, wherein the analyzing comprises image recognition analysis and at least one of:

time analysis;

location analysis; or text analysis;

wherein the analyzing further comprises determining correlations between the individual pieces of data based on shared temporal, spatial, or semantic properties identified during the analyzing;

performing the image recognition analysis on an image to extract additional image details, wherein the additional image details are stored as correlated metadata;

linking the individual pieces of data based on the determined correlations by storing relationship information within the correlated metadata, wherein the correlated metadata comprises the stored relationship information establishing links between the individual pieces of data, the correlated metadata correlating the individual pieces of data based on the identified shared temporal, spatial, or semantic properties, the correlated metadata thereby correlating the individual pieces of data to at least one of a location or an event described by the associated metadata and enabling searching based on the location or the event;

autonomously determining, by an artificial intelligence (AI) search assistant and without receiving a search command from a user, a search query based on at least one of:

calendar data corresponding to an upcoming event; or geo-location data corresponding to a location of a user device;

searching, by the AI search assistant, the correlated metadata using the determined search query to identify information correlated with the event or the location; and providing a search result comprising the identified information.

10. The computer program product of claim 9, wherein generating the correlated metadata further comprises analyzing the individual pieces of data to extract additional details from the individual pieces of data and storing the additional details in the correlated metadata.

11. The computer program product of claim 10, wherein analyzing the individual pieces of data to extract the additional details from the individual pieces of data further comprises performing an image recognition on an image to extract additional image details, wherein the additional image details are stored as correlated metadata.

12. The computer program product of claim 11, wherein performing the image recognition to extract the additional image details comprises performing the image recognition to determine at least one of an image location, an identity of a person, or an object in the image.

13. The computer program product of claim 12, further comprising comparing the additional image details to other data to correlate the additional image details to at least one of the event or the location.

14. The computer program product of claim 12, wherein comparing the additional image details to other data to correlate the image to at least one of the event or the location comprises comparing the additional image details to at least one of a calendar entry of a user or a diary entry of the user.

15. The computer program product of claim 9, wherein the correlated metadata comprises a data grouping that relates the individual pieces of data over at least one dimension.

16. The computer program product of claim 15, wherein the data grouping relates the individual pieces of data based on at least one of: the location or the event.

* * * * *